United States Patent [19]
Noirjean et al.

[11] Patent Number: 5,923,265
[45] Date of Patent: Jul. 13, 1999

[54] PORTABLE RECEIVER COMPRISING A MANUALLY ACTUABLE CONTROL DEVICE

[75] Inventors: Pierre-André Noirjean, Develier; Viron Teodoridis, Hauterive, both of Switzerland

[73] Assignee: Eta SA Fabriques d'Ebauches, Grenchen, Switzerland

[21] Appl. No.: 08/759,122

[22] Filed: Dec. 2, 1996

[30] Foreign Application Priority Data

Dec. 29, 1995 [EP] European Pat. Off. ............... 95120716

[51] Int. Cl.[6] .................................................. G04B 47/00
[52] U.S. Cl. ........................................ 340/825.44; 368/10
[58] Field of Search ........................... 340/825.44, 311.1; 368/10, 45, 55; 455/334, 351

[56] References Cited

U.S. PATENT DOCUMENTS

| | | | |
|---|---|---|---|
| 5,088,070 | 2/1992 | Shiff | 368/10 |
| 5,285,426 | 2/1994 | Teodoridis | 368/10 |
| 5,329,501 | 7/1994 | Meister et al. | 368/10 |
| 5,426,825 | 6/1995 | Soren et al. | 24/3.12 |
| 5,537,678 | 7/1996 | King et al. | 455/348 |

FOREIGN PATENT DOCUMENTS

| | | |
|---|---|---|
| 0 339 482 | 11/1989 | European Pat. Off. . |
| 0 660 258 | 6/1995 | European Pat. Off. . |
| 38 15 514 | 11/1988 | Germany . |
| 2 116 297 | 9/1983 | United Kingdom . |

*Primary Examiner*—William A. Cuchlinski, Jr.
*Assistant Examiner*—Yonel Beaulieu
*Attorney, Agent, or Firm*—Griffin, Butler, Whisenhunt & Szipl, LLP

[57] ABSTRACT

Portable receiver for receiving and displaying radio broadcast messages having a series of characters, the portable receiver including a housing (6) having at least one face (7); a memory (45) for storing messages; a display (2) mounted on or visible through the face, for displaying the stored messages; and at least one control device (4) including a manually actuable member (200), the control device being adapted to enable manipulation of the stored messages by a rotation applied to the manually actuable member. Control device (4) includes a stem (205) rotatably mounted in housing (6) around its longitudinal axis. Manually actuable member (200) includes a dome-shaped portion (5) at least partially emerging from face (7). Stem (205) is fixedly attached to manually actuable member (200) so that dome-shaped portion (5) is rotatable around the longitudinal axis.

7 Claims, 10 Drawing Sheets

PORTABLE RECEIVER COMPRISING A MANUALLY ACTUABLE CONTROL DEVICE

The present invention concerns a portable receiver for receiving and displaying radio broadcast messages comprising a series of characters, and in particular such a portable receiver comprising a housing having at least one face, memory means for storing said messages, display means for displaying said stored messages, said display means being mounted on or visible through said face, and a control device including a manually actuable member, said control device being adapted to enable the manipulation of said stored messages by a rotation applied to said manually actuable member.

The document EP-A-0 582 150, in the name of the present applicant, describes a portable receiver of this type. This receiver, which in this case is incorporated in a wristwatch, includes a liquid crystal display mounted in the watchcase so as to be visible through an opening in the dial. A roller-ball, which forms part of a device for controlling the operation of the portable receiver, is mounted in the caseband on the same face of the watch as the dial for ease of operation of the various functions of the portable receiver. Part of the roller-ball projects through an opening in the watchcase for manual actuation by the user. If the roller-ball is rolled in a direction parallel to the longitudinal axis of the bracelet, the received messages stored in an internal memory are displayed one after the other by the liquid crystal display. If the roller-ball is rolled in a direction perpendicular to the longitudinal axis of the bracelet, functions such as turn-on, turn-off or special operating mode may be chosen.

A control device including a roller-ball such as described in this document is desirable in many applications, notably those in which the portable receiver is compact and the space available for providing means for controlling its operation is limited. It has been found that the application of a rotating movement is more easily and more accurately controllable by a user than is the application of a pressure, such as is required with a conventional push-button. Moreover, a rotating movement can imparted to such a roller-ball with only one finger so as to leave the display surface relatively unobscured.

Such a portable receiver, however, presents a number of inconveniences. Firstly, the arrangement described in the document EP-A-0 582 150 is mechanically complex and delicate. Secondly, the control device, of which the roller-ball forms part, is susceptible to trap dirt and other unwanted impurities inside, thus tending to block the correct operation of the control device. Thirdly, the direction of rotation, and thus the functionality of the receiver, can only be chosen by the user with a certain degree of difficulty, particularly in view of the small dimensions of the receiver.

An aim of the present invention is a portable receiver of the type defined hereabove which ameliorates or overcomes the inconveniences of known portable receivers.

Another aim of the invention is a portable receiver which improves the precision and the ease of operation of known portable receivers.

With this in mind, the present invention provides a portable receiver for receiving and displaying radio broadcast messages comprising a series of characters, said portable receiver comprising a housing having at least one face, memory means for storing said messages, display means for displaying said stored messages, said display means being mounted on or visible through said face, and at least one control device including a manually actuable member, said control device being adapted to enable the manipulation of said stored messages by a rotation applied to said manually actuable member, characterised in that said control device includes a stem rotatably mounted in said housing around its longitudinal axis, in that said manually actuable member includes a dome-shaped portion at least partially emerging from said face, and in that said stem is fixedly attached to said manually actuable member so that said dome-shaped portion is rotatable around said longitudinal axis.

In a portable receiver having this combination of features, advantageous features of the prior art, such as the actuation of the control member from the same as the display, the control of the receiver functions by rotational movements and the use of one finger only, are able to be preserved whilst providing a control device which is both simple and reliable. Moreover, the control device may be more easily and more precisely operated by the user as the direction of the rotational movements applied are fixed around a predetermined axis of rotation.

The following description refers in more detail to the various features of the portable receiver of the present invention. In order to facilitate an understanding of the invention and its various advantages, reference is made in the description to the accompanying drawings where the portable receiver is illustrated in a preferred embodiment. It is to be understood that portable receiver is not limited to the preferred embodiment as illustrated in the drawings.

DESCRIPTION OF PREFERRED EMBODIMENTS

Figures 1, 2:
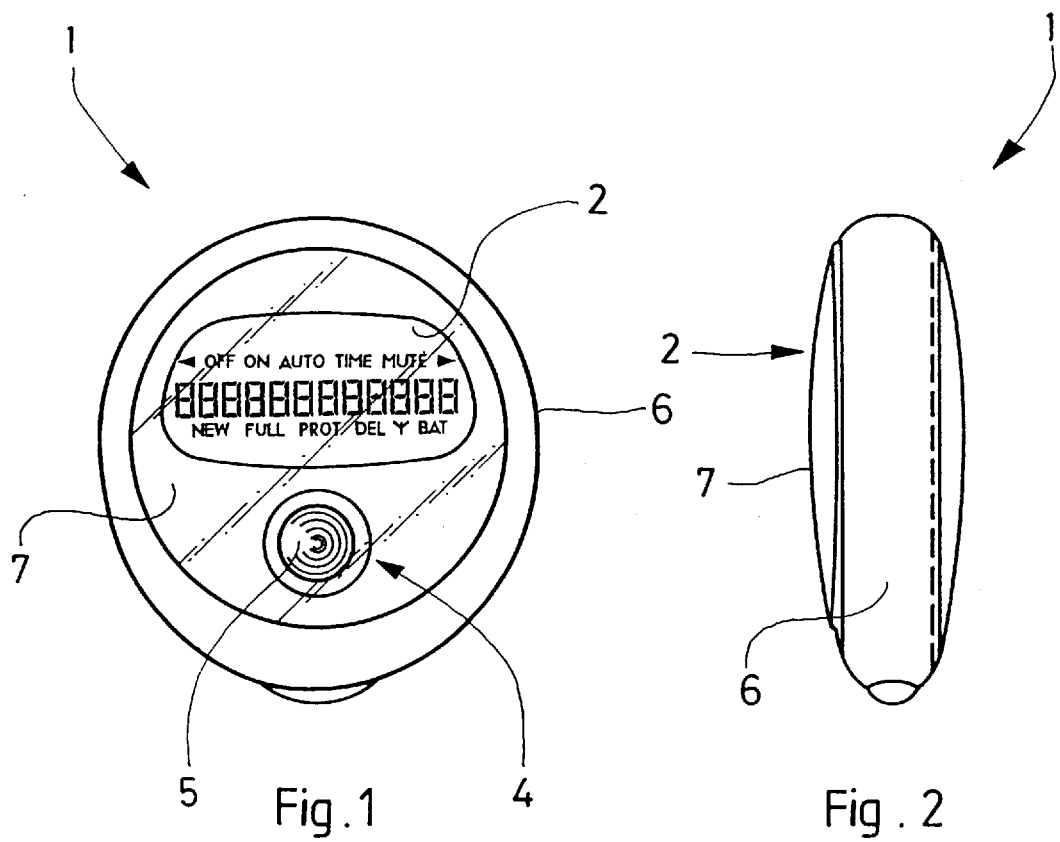
FIG. 1 is a plan view of an embodiment of the portable receiver according to the invention.
FIG. 2 is a side view of the portable receiver of FIG. 1.

FIGS. 1 and 2 are respectively a plan view and a side view of one embodiment of the portable receiver according to the invention. The portable receiver includes a pager system, i.e. an arrangement, comprising a receiver for radio-broadcast messages comprising a series of characters and a memory for storing such messages, such receiver and memory forming the object of a description which will be found further on. The messages are captured by an antenna, such as that described in the patent document EP-A-0 339 482, mounted within a housing 6. The messages appear on a cell 2 formed for example by a liquid crystal mounted to or visible through a face 7 of the housing 6. Cell 2 is shown in more detail in FIG. 3 which is an enlarged view of said cell. The portable receiver 1 also preferably includes a timekeeper which displays the time of day at least by means of the cell 2. The portable receiver further includes at least one control device 4 comprising a dome-shaped portion 5 adapted to be manually actuable and the description of which is to follow. An acoustic diffuser (not shown) enables signalling, inter alia, of the arrival of a message.

Figure 4:
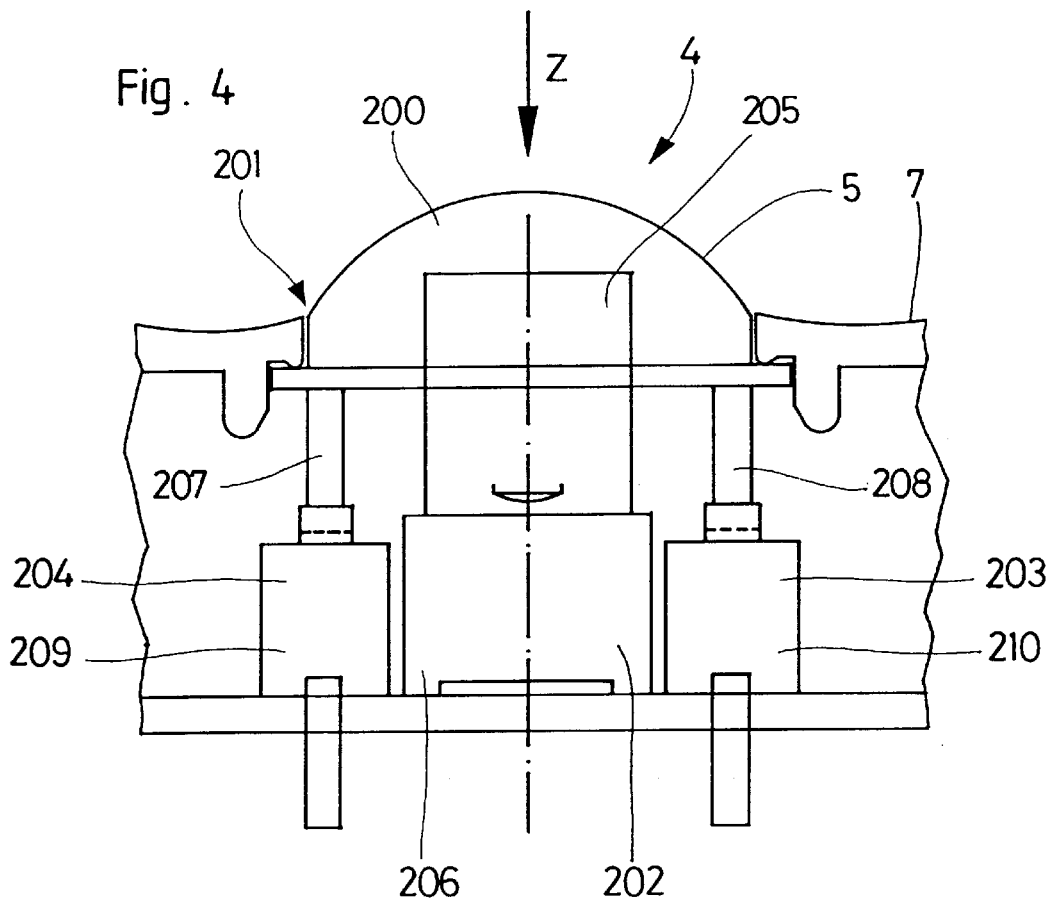
FIG. 4 is an enlarged side view of one embodiment of the control device of the portable receiver of FIG. 1.
Figure 5:
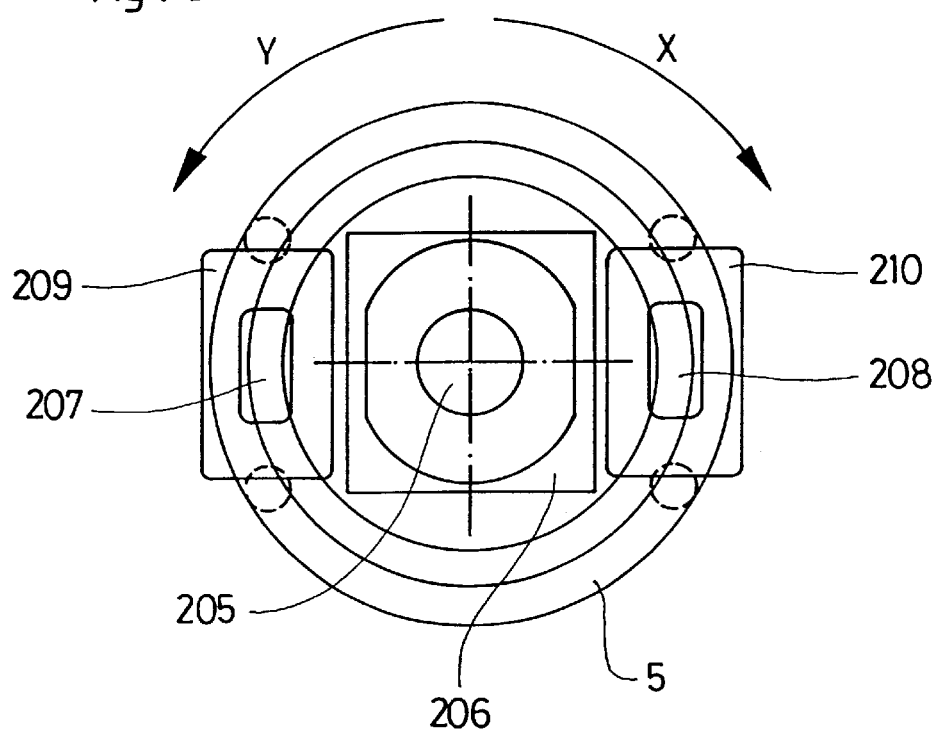
FIG. 5 is a plan view of the control device of FIG. 4.
Figure 6:
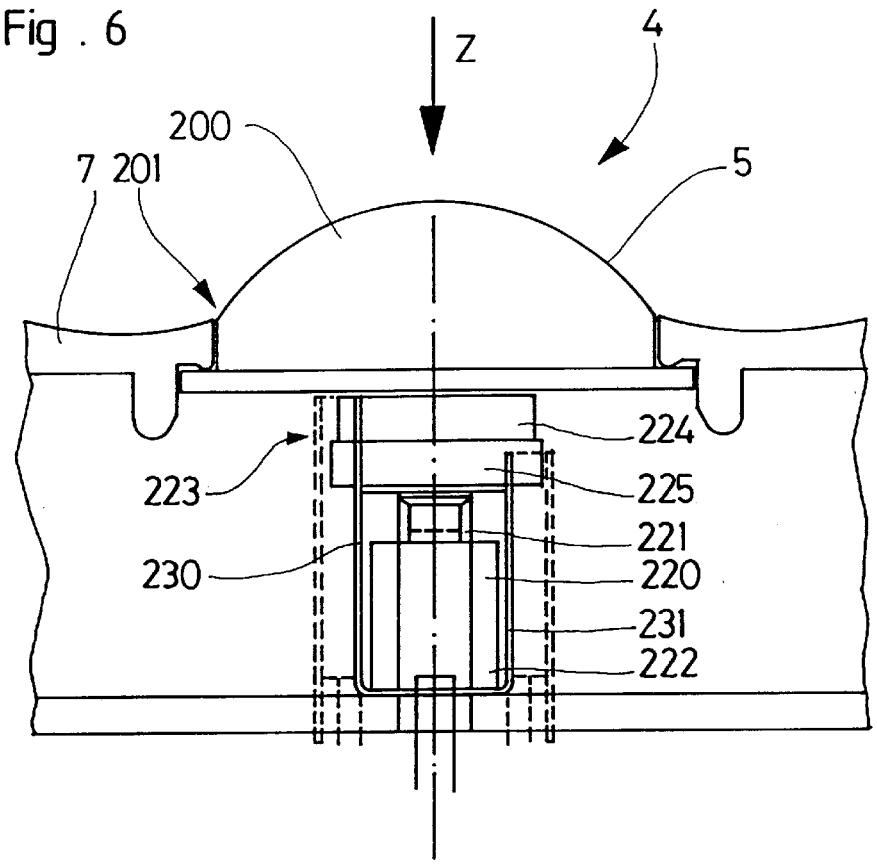
FIG. 6 is a side view of further embodiment of the control device of the portable receiver of FIG. 1.
Figure 7:
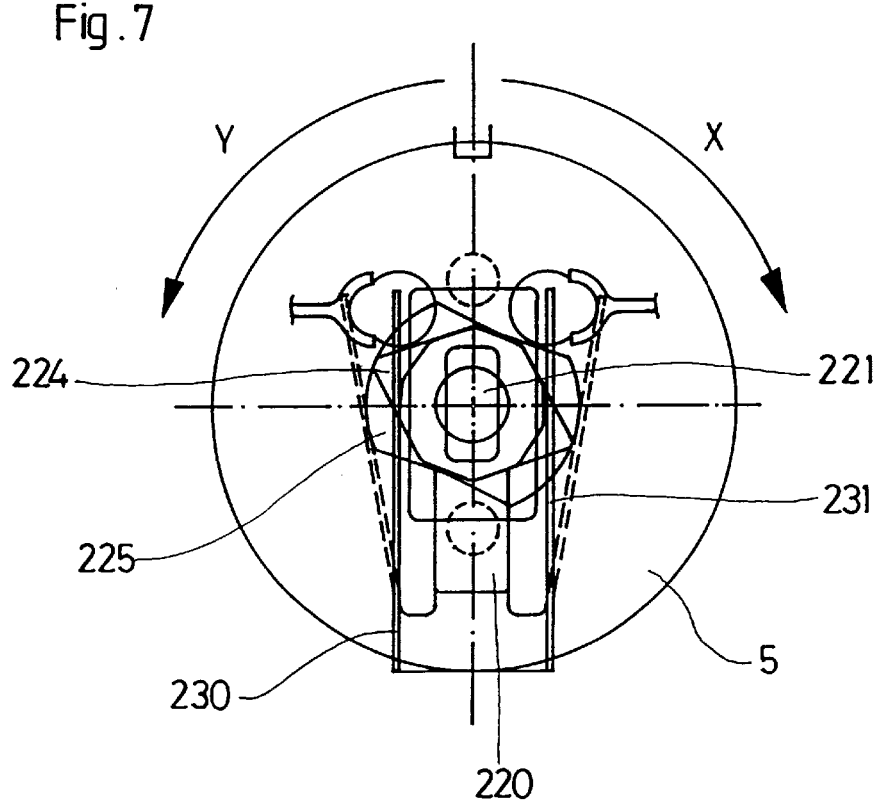
FIG. 7 is a plan view of the control device of FIG. 6.

The dome-shaped portion 5 can be manoeuvred in three different directions according to a mechanism which is to be explained now with the help of FIGS. 4 to 7. As is seen in FIGS. 5 and 7, the dome-shaped portion 5 may be rolled manually in a first circular direction Y thanks to which messages contained in the memory can at least be displayed one after the other. The dome-shaped portion 5 can also be rolled in a second circular direction X opposite to the first circular direction Y. The manipulation of the dome-shaped portion in the circular direction X enables choosing at least functions of turn-on, turn-off or entry into a special operational mode of the portable receiver. Finally, the dome-shaped portion 5 as best seen in FIGS. 4 and 6, can be pressed in a third direction Z perpendicular to the first two circular directions X and Y, thanks to which the displayed message can at least be erased or protected.

FIG. 4 is an enlarged side view of a first embodiment of the control device 4 shown in FIG. 1, whilst FIG. 5 is an enlarged plan view of this same control device. This arrangement includes a manually actuable member 200 having a dome-shaped portion 5 at least partially emerging from the face 7 of the portable receiver housing 6 through an opening 201. The control device 4 further comprises a digital encoder 202 and two switching devices 203 and 204.

The digital encoder 202 (for example of the type 3375 of the Bourns company) comprises a stem 205 fixedly attached to the manually actuable member 200 and rotatably mounted about its longitudinal axis in a package 206. This latter includes two conductive blades 51 and 52 (not shown in FIGS. 4 and 5) which respectively enter into contact with first E1 and second F1 conductive tracks when the stem 205 is rotated about its longitudinal axis.

The two switching devices 203 and 204 (for example of the type Light Touch Switches series PJ of the Panasonic company) comprise respectively two shafts 207 and 208. These latter are slidably mounted along their longitudinal axes respectively in two packages 209 and 210. Depression of the shaft 207 causes a conductive blade 53 (not shown in FIGS. 4 and 5) mounted in the package 209 to enter into contact with a conductive track K. Similarly, depression of the shaft 208 causes a conductive blade 54 (not shown in FIGS. 4 and 5), which is connected in parallel with the conductive blade 53, to enter into contact with the conductive track.

In other embodiments of the invention, only one such switching device may be provided.

FIG. 6 shows another embodiment of the control device 4 of the portable receiver of FIG. 1, whilst FIG. 7 is an enlarged plan view of this same control device. As before, the control device 4 includes the manually actuable member 200 having a dome-shaped portion 5 at least partially emerging from the face 7 of the portable receiver housing 6 through an opening 201 as shown in FIG. 4. However in this embodiment, the control device 4 comprises only a single switching device 220, which is identical in function to the switching devices 202 and 203, comprising a shaft 221 mounted in a package 222.

In addition, the control device shown in FIGS. 6 and 7 comprises a cam 223 and two conductive blades 230 and 231. The cam 223 includes two stages 224 and 225 each having a central hole intended to receive the shaft 221 of the switching device. The stages 224 and 225 are fixedly mounted to the manually actuable control member 200, whilst being rotatable about the longitudinal axis of the stem 221. the stages 224 and 225 are angularly shifted relative to each other by about 45°.

The conductive blades 230 and 231 are elastic and bear respectively on stages 224 and 225 in a manner that when the cam is driven in rotation by the manually actuable control member, the blades 224 and 225 are alternatively brought into contact with the conductive tracks E1 and F1.

As seen in FIG. 1, the control device 4 of the portable receiver 1 includes a dome-shaped portion 5 emerging from the face 7 of the housing 6 and may be operated by a finger of the hand in the three different directions set forth hereinabove.

In the context of this description, it is to be appreciated that the phrase "dome-shaped" is intended to refer to all objects having a surface which is neither parallel nor perpendicular to the face of the portable receiver from which it emerges, and which is able to be rotated around its apex by a translational movement imparted thereto by a finger of a user of the portable receiver of the invention.

Figure 3:
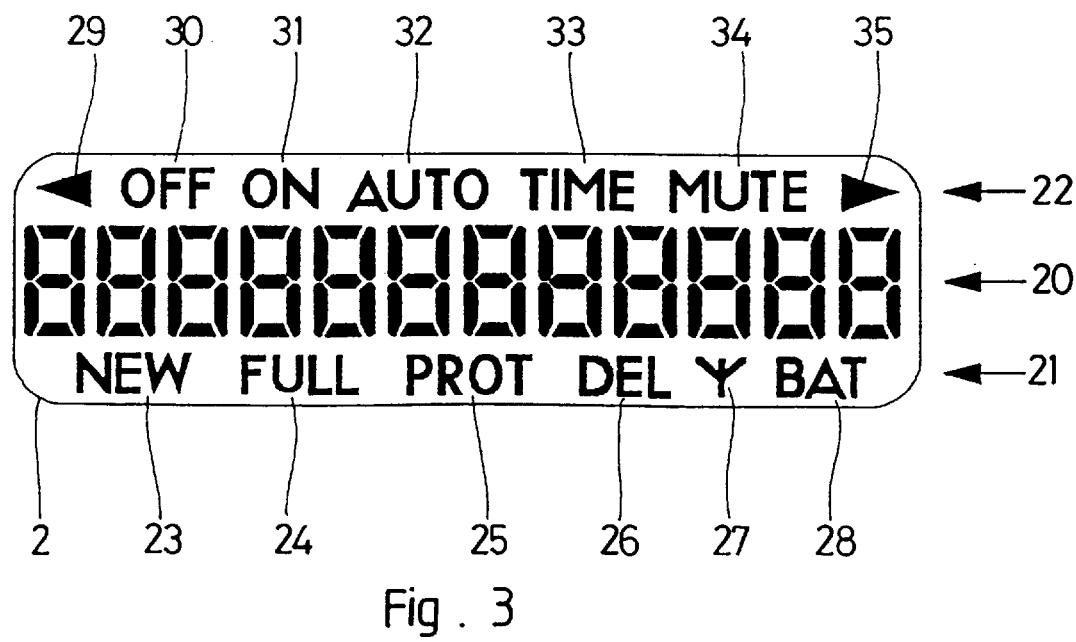
FIG. 3 is an enlarged illustration of the display cell of the portable receiver of FIG. 1 showing the various graphic representations capable of being displayed thereon.

FIG. 3 is an enlarged showing of the display cell referenced 2 on FIG. 1. Such cell includes a zone 20 referred to as the message zone and two zones 21 and 22 referred to as indicators. In zone 20 appear messages which can be made up of digits and letters. Each sign includes a set of segments, here seven segments at the maximum. In the display taken as example, the message can contain at maximum twelve signs, In the indicator zone 21, there is found : at 23, the indication NEW which signals a new message and remains displayed as long as the latter has not been acknowledged by a short pressure on the dome-shaped portion; at 24, the indication FULL which indicates that the memory is full; at 25, the indication PROT signalling the operation of protecting the message; at 26, the indication DEL signalling the erase function; at 27, the sign Y indicating that the radio ranges is good, thus that message reception is possible; at 28, the indication BAT indicating that the power cell of the pager must be changed. In the indicator zone 22, there is found : at 29, a sign indicating that there has been overflow of the message to the left of the cell; at 30, the indication OFF indicating that the pager is tuned off; at 31, the indication ON signalling that the pager is turned on; at 32, the indication AUTO signalling that the pager is turned on and turned off automatically; at 33, the indication TIME permitting setting of the internal clock of the pager; at 34, the indication MUTE signalling that the pager is in a standby state, a t 35, a sign indicating that there is overflow of the message to the right of the display cell.

Figure 8:
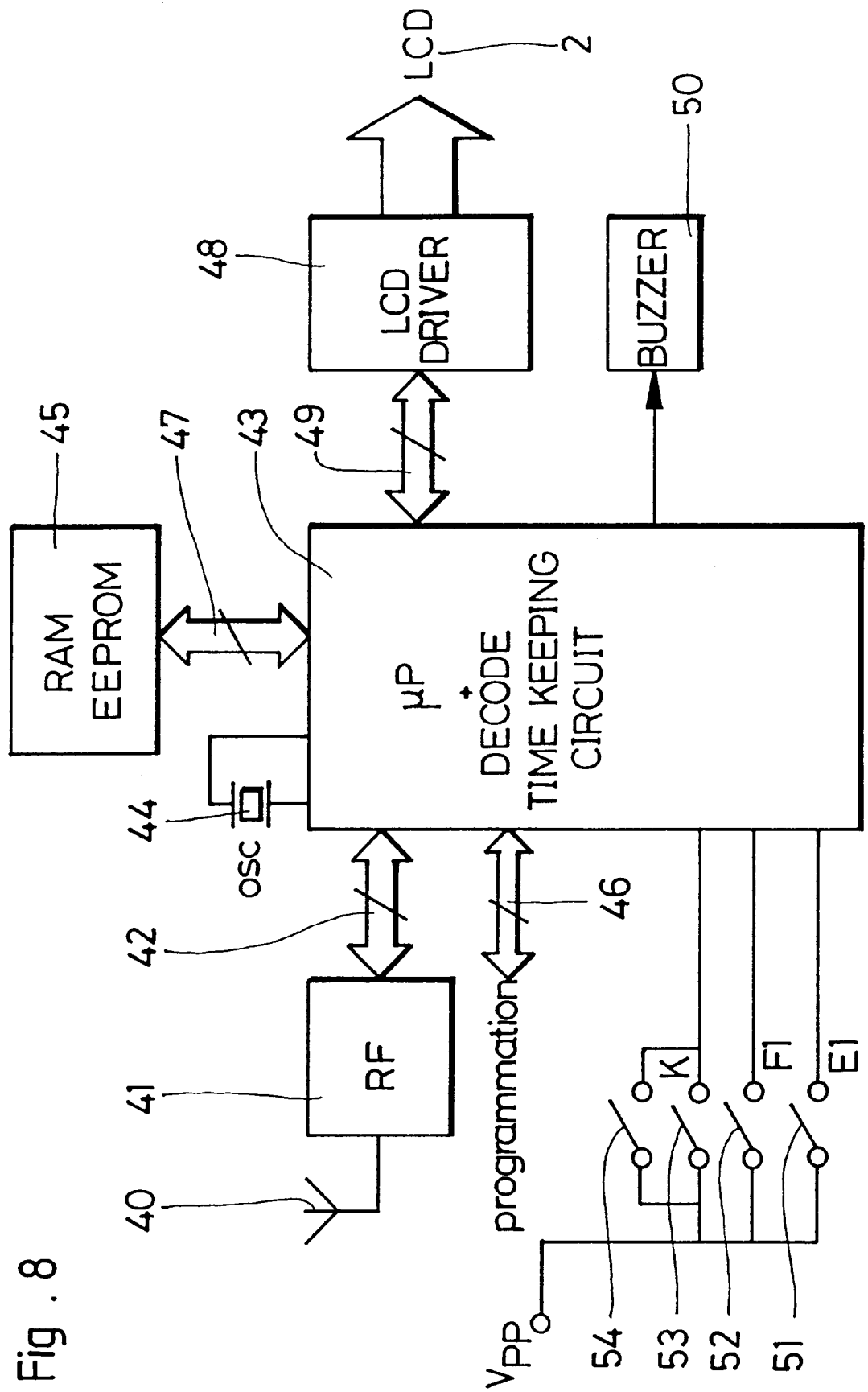
FIG. 8 is a block schematic showing the electronic part of the portable receiver of FIG. 1.

FIG. 8 is a block schematic showing the electronic part of the portable receiver illustrated on FIG. 1. Messages captured by the antenna 40 are received by an RF circuit 41 (for example of the type UAA 2033 of the Philipps Company) which is coupled to a special circuit 43 by a three wire bus 42. The special circuit 43 allies an ordinary microcomputer with a decoder in order to decode the messages present at the output of RF circuit 41 (for example of the type PCF 5001 of the Philipps Company). Such special circuit further includes a time-keeping circuit (for example of the type H 5026 of the EM Microelectronic-Marin Company) including a clock oscillator 44 and a frequency divider. The decoder is associated with an exterior EEPROM memory 45 which can be programmed by the two line conductor 46 referred to as the programming line, in order to report only messages intended for this specific pager possessing its own radio identification code (RIC) and responding on the occasion to the radioelectric calling code Nr 1 of the CCIR (based on the recommendation CCIR 584-1, Dubrovnik, 1986). The special circuit 43 is coupled by a nine wire bus 47 to the memory EEPROM already mentioned, such memory being associated with another memory RAM. The time-of-day indications and the messages to be made to appear on the liquid crystal display LCD 2 are controlled by a driver 48 itself coupled to circuit 43 by a seven wire bus 49. To the special circuit 43 is coupled an acoustic alarm or buzzer 50. To circuit 43 are connected the conductive tracks E1 and F1 to which correspond respectively to conductive blades 51 and 52 of the digital encoder 202 (rotating the dome-shaped portion 5 in the X or Y directions) and the track K which corresponds to blade 53 (pressing the dome-shaped portion 5 in direction Z), such tracks and blades having been described hereinabove and discussed with reference to FIGS. 4 to 7. Blades 51 to 53 are all connected to a common potential $V_{pp}$. The fact that the dome-shaped portion 5 is rotated in direction Y, for example, has as result that tracks E1 and F1 are coupled alternately to potential $V_{pp}$. Such alternation is taken into account by circuit 43 which is then capable of recognizing initially the fact that the dome-shaped portion is driven in rotation and also in which sense such rotation takes place.

Memory RAM 45 of FIG. 8 is of standard construction. In such memory RAM messages are stacked one over another, the oldest at the bottom and the most recent at the top of the stack and a zone without message surmounts the most recent message, such zone exhibiting a neutral display when it is shown (see FIG. 12). Memory RAM being able to contain only a limited number of messages, it is evident that if said memory is full, a newly entering message is going to bring about loss of the oldest message if such latter is not protected.

With the help of FIGS. 9 to 14, there will be described now the manner of making use of the portable receiver in acting on the dome-shaped portion 5. The symbols used on the figures under discussion with their significance are as follows:

<<: long duration pressure on the dome-shaped portion

<: short duration pressure on the dome-shaped portion

A pressure on the dome-shaped portion is long (<<) when its duration exceeds one second. Such pressure is short (<) when such duration is less than one second. Short and long pressures can be acknowledged by an acoustic bip.

Generally, the rotation of the dome-shaped portion 5 in the direction X enables selecting a function while a short duration pressure enables validating the chosen function or a long duration pressure permits entering into a phase or special menu. Generally as well, the rotation of the dome-shaped portion 5 in direction Y enables passing from one message to another and permits reaching the neutral display.

Figure 9:
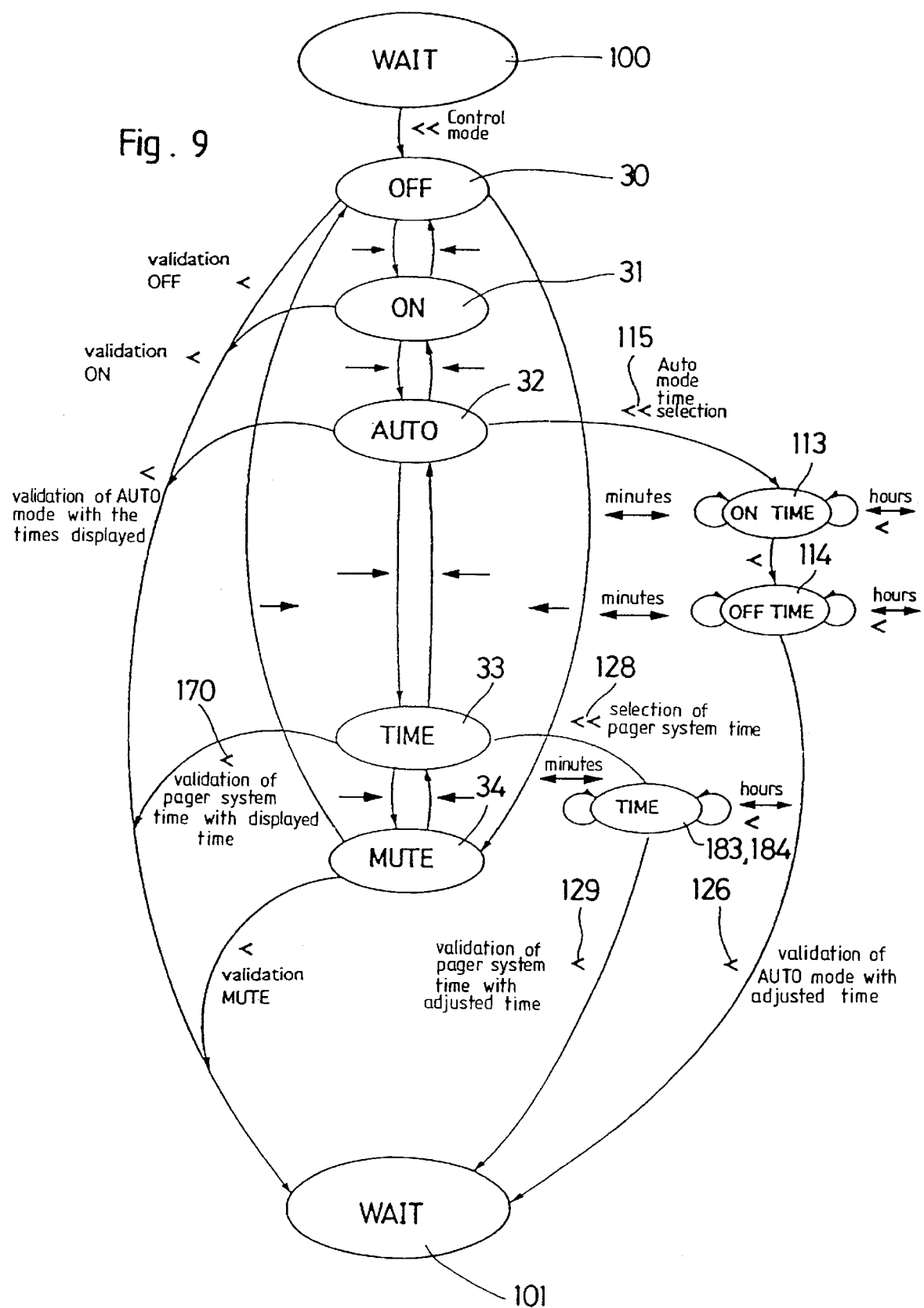
FIG. 9 is a diagram explaining the functions of the control device of the portable receiver of FIG. 1, such diagram illustrating the states of the portable receiver of the control mode.
Figure 10:
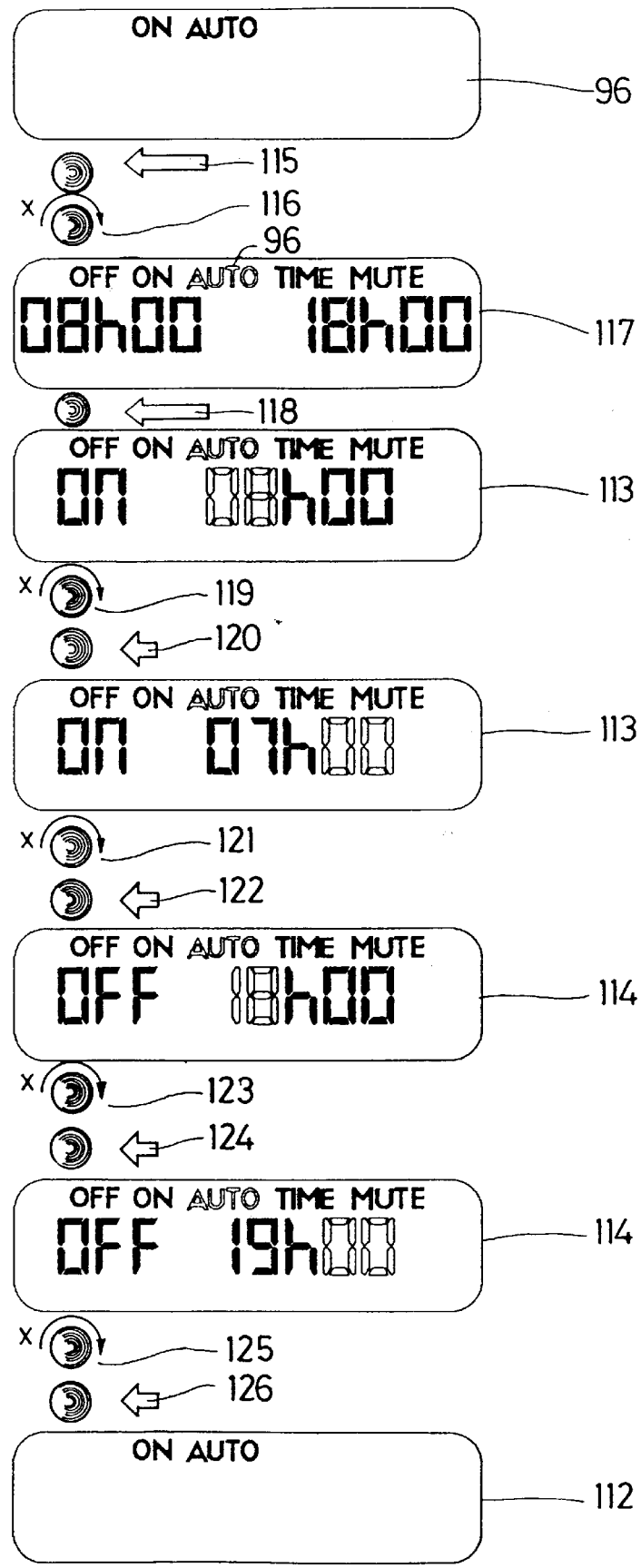
FIG. 10 shows the manipulation to be exerted on the dome-shaped portion of the control devices of FIGS. 4 to 7 in order to set the predetermined times of turn-on and of turn-off.
Figure 11:
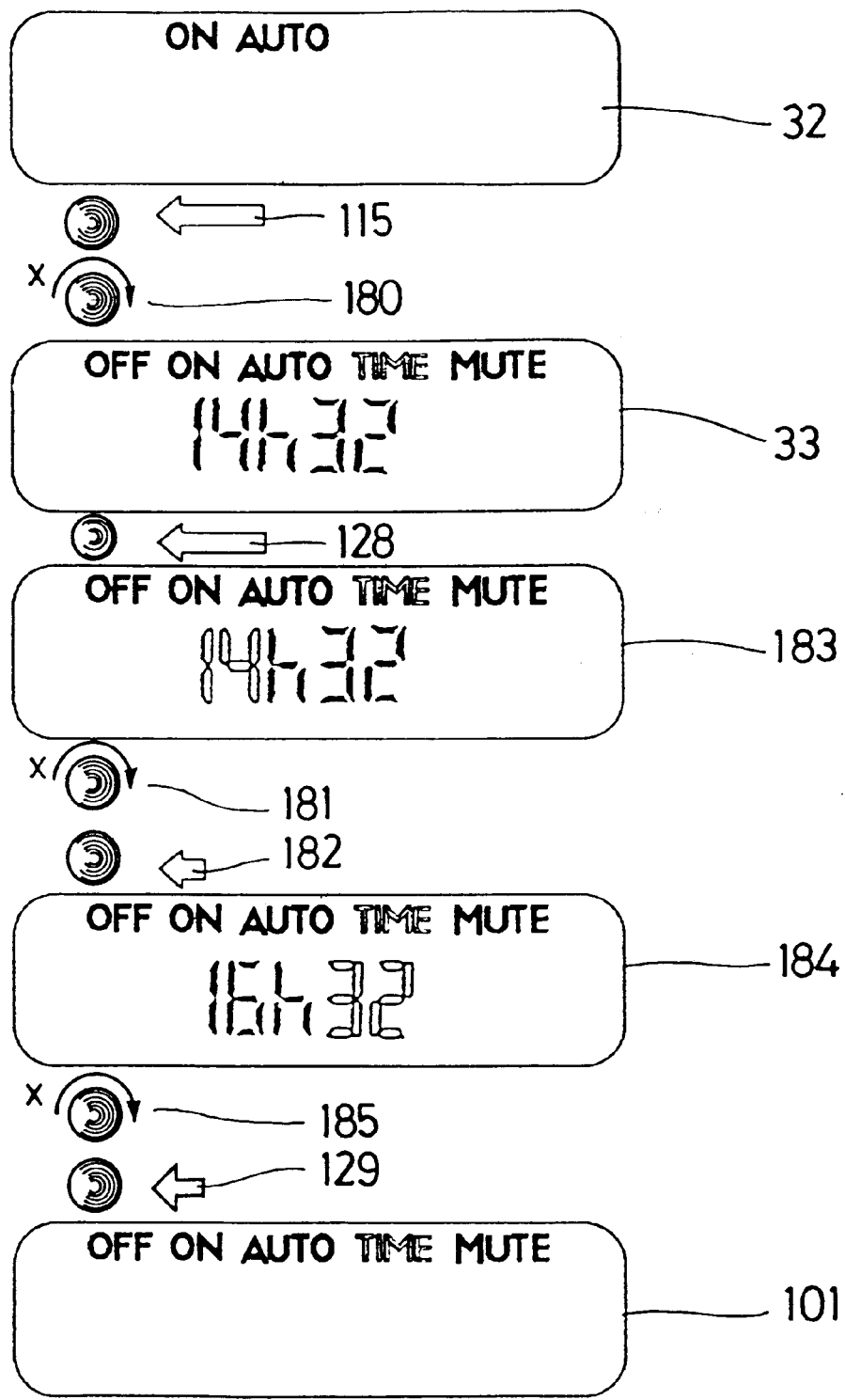
FIG. 11 shows the manipulation to be exerted on the dome-shaped portion of the control devices of FIGS. 4 to 7 to bring about time setting of the internal clock of the portable receiver.

FIG. 9 is a diagram explaining the functions of the control device 4 of the portable receiver 1 shown on FIG. 1, such diagram illustrating the states of the portable receiver in the control mode, such states being signalled by indicators 30 (OFF) to 34 (MUTE) illustrated on FIG. 3.

In causing the dome-shaped portion 5 to rotate in the Y direction, the pager is brought into the waiting mode 100 for which the display is neutral. From there a long pressure << is exerted on dome-shaped portion 5 which illuminates all state indicators from OFF (30) to MUTE (34) with the OFF indication blinking. The OFF state can then be validated by exerting a short pressure < on the dome-shaped portion 5. The portable receiver then returns to the waiting position 101 with the OFF indicator illuminated. If the ON state is wished for, a long pressure << is exerted on dome-shaped portion 5 which illuminates all the state indicators from OFF (30) to MUTE (34) with the OFF indication blinking. The dome-shaped portion 5 is then rotated in the direction X until the indicator ON (95) blinks. The ON state can then be validated in exerting a short pressure < on the dome-shaped portion 5. The pager then returns to the waiting position 100 with the indicator ON illuminated. As shown by FIG. 9, the other states AUTO 32, TIME, 33 and MUTE 34 can be obtained in the same manner, in observing that the selection of the state is obtained by rotating the dome-shaped portion 5 in the direction X until blinking of the desired indicator and that the validation of the state which blinks is indicated by a short pressure on the dome-shaped portion 5. It is also observed on FIG. 9 that once having arrived at the MUTE state 34, it is possible to return to the OFF state 30 in passing by all the intermediate states by rotating the dome-shaped portion 5 in the Y direction.

FIG. 9 further shows that from the OFF state 30 the MUTE state 34 can be directly attained by rotating the dome-shaped portion 5 in the Y direction. Inversely, from the MUTE state 34 it is possible to return directly to OFF state 30 by rotating the dome-shaped portion 5 in the X direction.

As indicated hereinabove, following a long pressure on the dome-shaped portion 5, all the indicators appear and one among them is blinking. Another manner of operation could consist of having only the selected indicator blink, the other indicators being extinguished.

If the states OFF and ON are self-understood, the states MUTE, AUTO and TIME merit further explanation.

The MUTE state 34 has as purpose to put the portable receiver into a standby state for which the received messages are at least stored in the memory RAM without having a sound signal draw the attention of the pager wearer to the fact that a message has arrived. Normally, the arrival of a message is visible on the display cell and is accompanied by an audible signal. In the MUTE state, such audible signal is suppressed. The visible signal which is that of the appearance of the message on the display cell could also be suppressed or materialized only by a serial number.

The AUTO state 32 has a purpose to turn on and turn off the pager automatically at times pre-programmed by the pager wearer. In selecting the AUTO state 32 rotating dome-shaped portion 5 and in validating such state by a short pressure on such dome-shaped portion 4, one returns to the wait mode 100 with the hours programmed by default, that is to say, those which are found in a special memory equipping the pager. The manner of adjusting the turn-on time ON TIME 113 and the turn-off OFF TIME 114 which appear on the diagram of FIG. 9 will now be explained likewise with the help of the manipulation program shown on FIG. 10.

Figure 12:
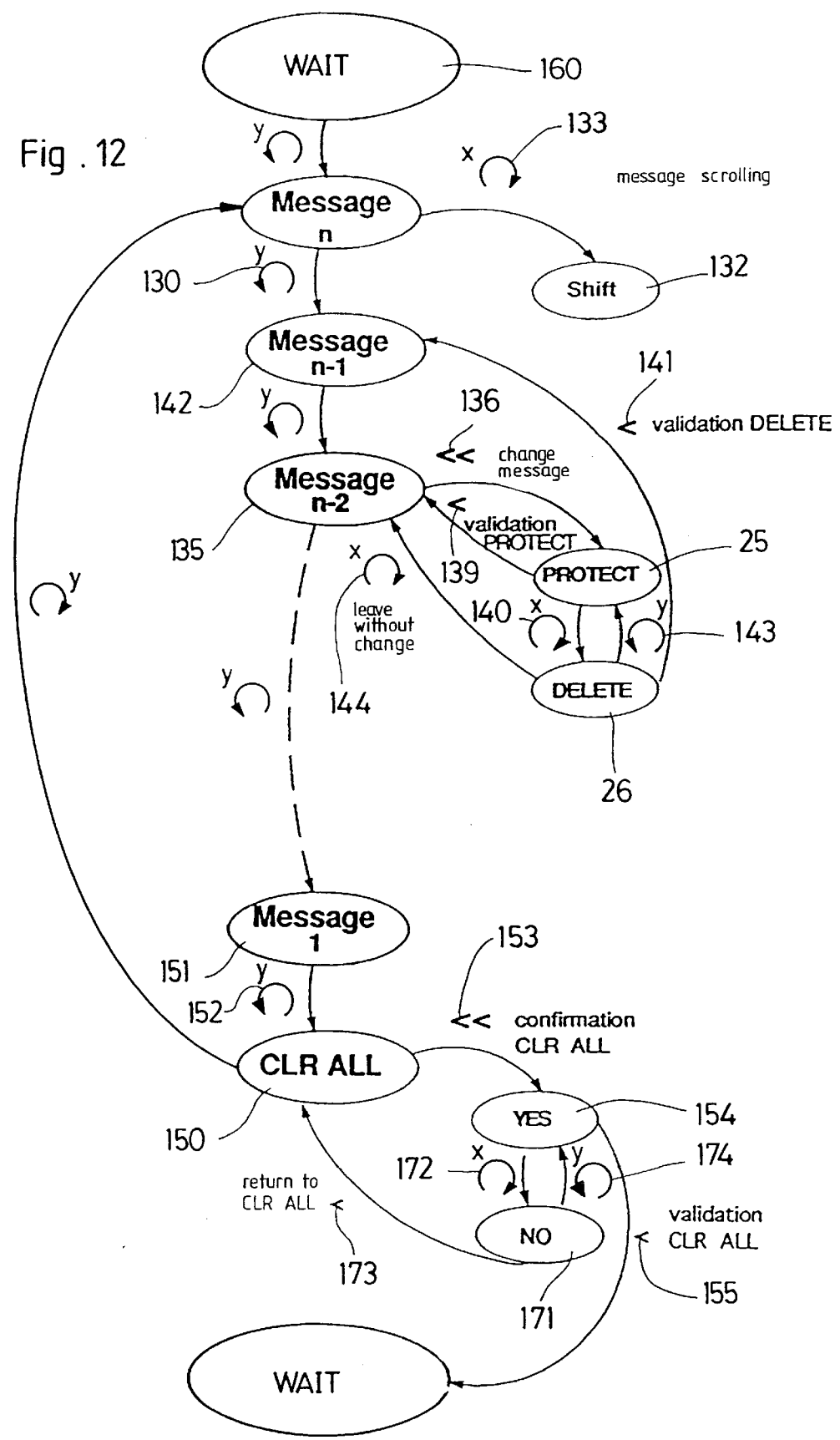
FIG. 12 is a diagram explaining the functions of the control device of the portable receiver of FIG. 1, such diagram illustrating the states of the portable receiver in the message mode.

Here it is pointed out that in FIGS. 10, 11, 13 and 14 a long pressure of the dome-shaped portion 5 has been symbolized by a long-tailed arrow which is equivalent to the symbols << of FIGS. 9 and 12. In the same manner, a short pressure on the dome-shaped portion is symbolized in FIGS. 10, 11, 13 and 14 by a short-tailed arrow which is equivalent to the symbols <of FIGS. 9 and 12.

The dome-shaped portion 5 is manipulated to have appear on one hand the neutral display and on the other hand the AUTO indicator 32 in the validated state, in proceeding as indicated hereinabove. The indicator AUTO will be accompanied by the indicator ON if the time at which one proceeds with such adjustments is comprised in the turn-on period of the AUTO state. If not, the OFF indicator is illuminated. One then enters (see FIG. 10) the control phase or menu of the times by a long pressure 115 on the dome-shaped portion 5. By a rotating action 116 on the dome-shaped portions in the X direction there is selected the AUTO state 32 which blinks, the blinking state being marked by bright letters AUTO on FIG. 10. When the AUTO mode is selected, there then appears on display 117 the turn-on time (08h00) and the turn-off time (18h00). Again a long pressure 118 is exerted on the dome-shaped portion 5 which has as result to enter into the adjustment mean of the AUTO time. The turn-on time (8h00) appears alone accompanied by the indication ON. The hours (08) blink. The hours are programmed by rotating action 119 of the dome-shaped portion 5 in the X direction. The new hours program (07) is validated by pressure 120 on the dome-shaped portion 5. The validation of the hours brings about blinking of the minutes (00) of the turn-on time. One then programs the minutes by rotating action 121 of the dome-shaped portion 5 in the X direction. The new minutes program (00) is validated by pressure 122 on the dome-shaped portion 5. Validation of the minutes brings about appearance of the turn-off time (18h00) with the OFF indication are blinking of the turn-off hours (18). The hours are programmed by rotating action 123 of the dome-shaped portion 5 in the X direction. The new hours program (19) is validated by pressure 1254 on the dome-shaped portion 5 which brings about blinking of the minutes (00) of the turn-off time. The minutes are programmed by rotating action 125 of the dome-shaped portion 5 in the X direction. The new minutes program (00) is validated by pressure 126 on the dome-shaped portion 5, such validation bringing about return to the neutral display 112 with the inscription AUTO and the inscription ON if the current time of day is comprised in the turn-on period.

The state TIME 33 shown on FIG. 9 has as purpose to set the pager to the time of day for correct operation of the AUTO function. Such time setting is brought about in the following manner if reference is also had to the manipulation program of FIG. 11: the pager is arranged in the neutral display with the AUTO state illuminated. Entry is made into a control phase of menu by a long pressure 115 on the dome-shaped portion 5. In rotating the dome-shaped portion 5 in the X direction the menu TIME 33 is selected, which brings about the display of the time of day (14h32). A new long pressure 128 on the dome-shaped portion 5 causes blinking in step 183 of the hours of the time of day (14), such hours being then adjustable by rotating 181 of the dome-shaped portion 5 in the X direction, then validated by a short pressure 182 on said dome-shaped portion 5. Validation of the hours brings about blinking of the minutes in 184 which can be adjusted by rotating 185 of the dome-shaped portion 5 then validated by a short pressure 129 on said dome-shaped portion 5, such validation 129 bringing about return to the neutral display 112.

In the case in which starting off from the TIME state 33, a short pressure 170 is exerted on the dome-shaped portion 5 instead of exerting a long pressure 128, one returns to the waiting position 101 in having validated the time already memorized in the portable receiver.

It will be noted that the AUTO state is an accessory function which is not indispensable to operation of the portable receiver. In a simplified version of this latter, it could be omitted. It will be further mentioned that there is provided an automatic return to the waiting mode starting out from any of the selected modes if no manipulation has been effected during thirty seconds.

FIG. 12 is a diagram explaining the functions of the control device of the portable receiver 1 of FIG. 1, such diagram illustrating the states of the portable receiver in the message mode.

In order to visualize the messages contained in the memory one after the other, the dome-shaped portion 5 is caused to rotate in the direction X. Rotating the dome-shaped portion 5 in the direction X causes disappearance of the message cell displayed (for example message n), an older message (message n-1, 142) being substituted for the vanished message.

In the case in which a message, message n for example, exceeds the capacity of the display cell, it is possible to have it run past (shift 132) sign by sign, in rotating the dome-shaped portion 5 in the direction Y 133. If the message exceeds the capacity of the display at the right (see FIG. 3), an overflow sign 35 is illuminated. In order to read the hidden signs, the dome-shaped portion 5 is rotated in the X direction until the sign 35 is extinguished. At such moment, the overflow sign 29 is illuminated, indicating thereby that the message exceeds the display capacity a the left.

Protection of a message is effected in the following manner. It is supposed that it is desired to protect message n-2 of FIG. 12, such message appearing under the reference 135 on FIG. 13. For this a long pressure 136 is exerted on the dome-shaped portion 5, which enables entering into a message treatment phase or menu in which indicators appear PROT 25 and DEL 26. The protection option PROT 25 is then selected by default. One can select then the desired option by rotating 138 the dome-shaped portion 5 in the X direction which operation in fact is not necessary since the indicator PROT is already blinking. Finally, the message protection state is validated by a short pressure 139 on the dome-shaped portion 5, a sign P 137 indicating such state. The indicators PROT and DEL have disappeared.

The erasure indicated by the term DELETE or DEL is effected in the following manner: it is supposed that it is desired to erase message n-2 indicated on FIG. 12, which message is referenced 135 on FIG. 14. For this, a long pressure 136 is exerted on the dome-shaped portion 5, which enables entering a message treatment phase or menu in which the indicator PROT 90 blinks by default, as mentioned in the preceding paragraph. The option DEL 91 is selected by rotating 140 the dome-shaped portion 5 in the X direction. The indicator DEL 91 blinks. Finally, the erase state is validated by a short pressure 141 on the dome-shaped portion 5, the message 135 then disappearing from the display cell on which now appears the more recent message n-1 referenced 142. FIG. 12 also shows that starting from the blinking DELETE option, one can either return to the PROTECT option by rotating 143 of the dome-shaped portion 5 in the Y direction, or return to message n-2 without it being affected, by rotating 144 of the dome-shaped portion 5 in the X direction.

Figure 13:
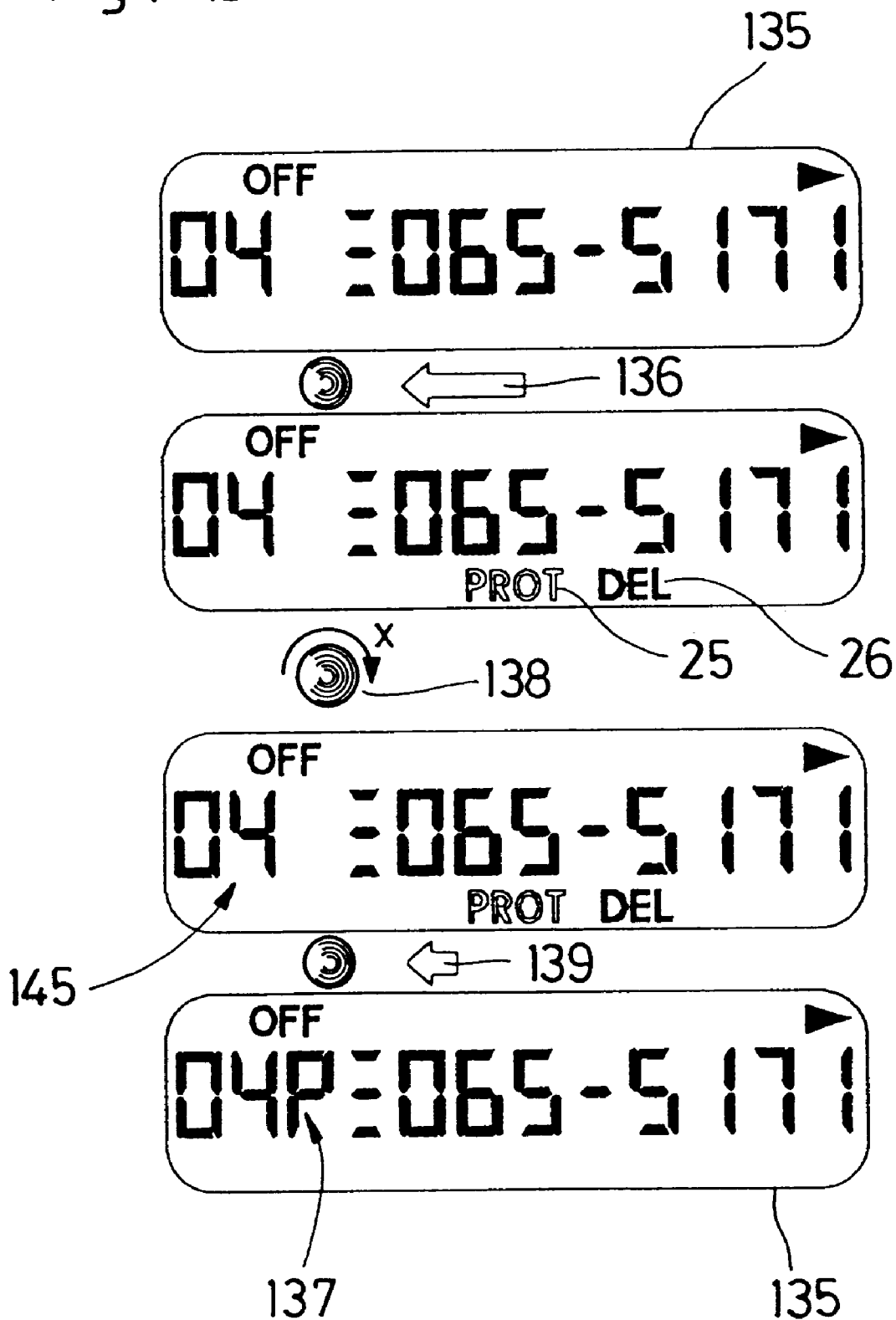
FIG. 13 shows the manipulation to be exerted on the control device of the portable receiver of FIG. 1 in order to protect a message contained in the memory.
Figure 14:
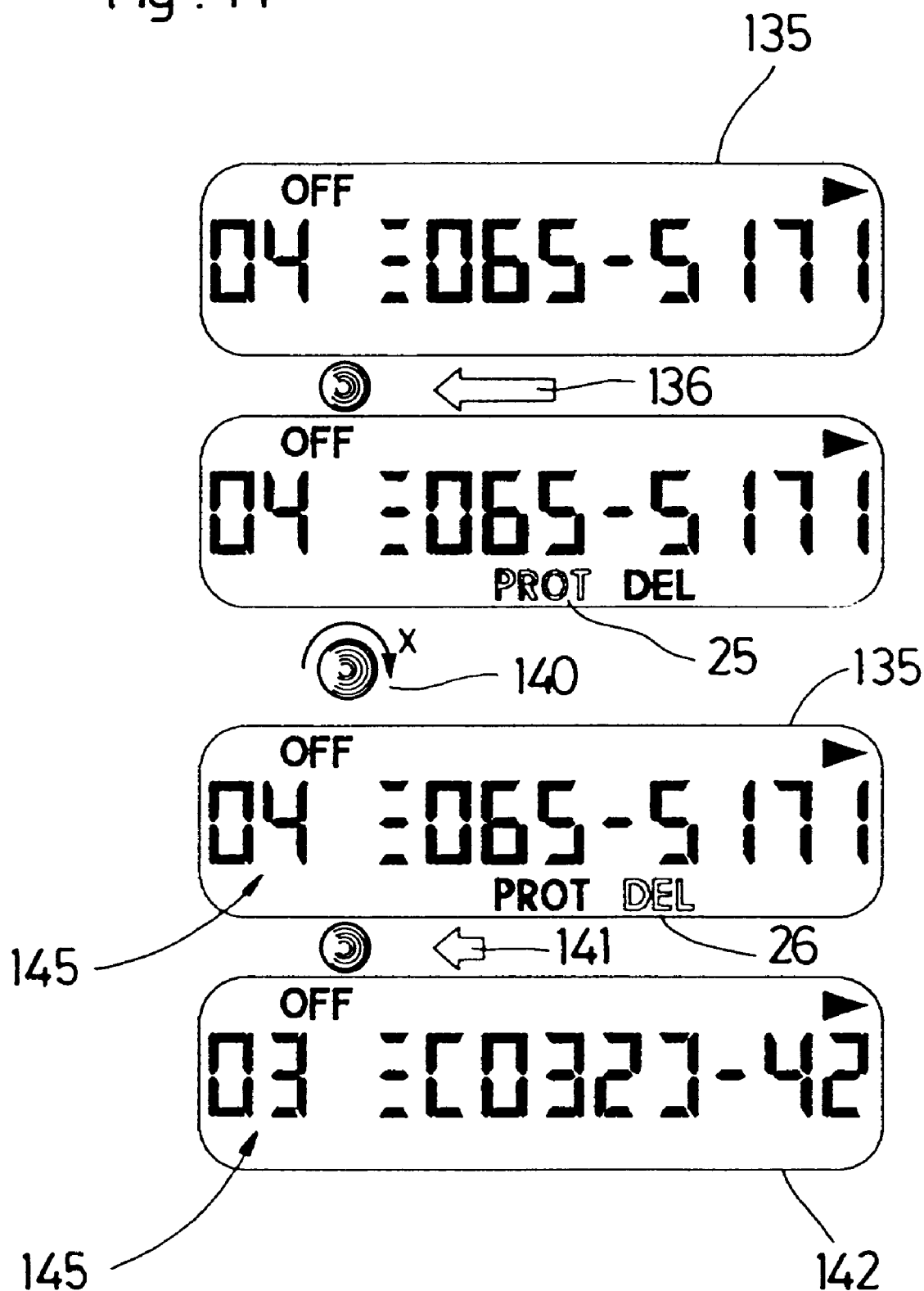
FIG. 14 shows the manipulation to be exerted on the control device of the portable receiver of FIG. 1 in order to erase a message contained in the memory.

As shown by FIGS. 13 and 14, the messages are preceded by a serial number 145. Here, as is seen, the protected message bears a P following the serial number.

As is further visible on FIG. 2, the pager can include arrangements for erasing on request all non-protected messages. In order to proceed with this general deletion symbolized at 150 on FIG. 12 by CLR ALL, the dome-shaped portion 5 is driven by rotating it until the first (the oldest) reviewed message 151 is obtained. From these further rotating in the Y direction 152 is exerted on the dome-shaped portion 5 in order to obtain CLR ALL displayed by the cell, which mode is confirmed by exerting a long pressure 153 on the dome-shaped portion 5. At this instant appears the blinking word YES referenced by 154. If there is then exerted a short pressure 155 on the dome-shaped portion 5, the function CLR ALL is effected and all non-protected messages are erased at once. It will be noted that during the operation which has just been described, messages could have arrived and thus not yet have been acknowledged. The procedure described hereinabove does not erase this type of message. FIG. 12 shows further that from the function YES 154 one can cause appearance of a function NO 171 in substitution by operating the dome-shaped portion 5 in the X direction 172. If the function NO 171 is validated by a short pressure 173 on the dome-shaped portion 5, there is a return to CLR ALL without a general erasure. It will be noted that starting from the display NO 171, one can return to YES 154 in operating the dome-shaped portion 5 in the direction Y 174.

Finally, it is to be understood that various modifications and/or additions may be made to the portable receiver without departing from the ambit of the present invention as defined in the claims appended hereto.

What is claimed is:

1. A portable receiver for receiving and displaying radio broadcast messages comprising a series of characters, said portable receiver comprising: a housing having at least one face; memory means for storing said messages; display means for displaying said stored messages, said display means being mounted on or visible through said face; and at least one control device including a manually actuable member, wherein said control device enables the manipulation of said stored messages by a rotation applied to said manually actuable member, said manually actuable member including a dome-shaped portion at least partially emerging from said face, and said control device including a stem rotatably mounted in said housing around its longitudinal axis and fixedly attached to said manually actuable member so that said dome-shaped portion is rotatable around said longitudinal axis, said stem being arranged such that its longitudinal axis extends in the same direction as the at least partially emerging dome-shared portion.

2. The portable receiver according to claim 1, wherein said control device is adapted to drive alternately first and second conductive blades which enter respectively into contact with first and second conductive tracks when said dome-shaped portion is rotated in either direction around the longitudinal axis of said stem.

3. The portable receiver according to claim 1, wherein said control device is adapted to close a switch when said dome-shaped portion is pressed in a direction along the longitudinal axis of said stem.

4. The portable receiver according to claim 3, wherein said control device comprises at least one switching device including a shaft slidably mounted along its longitudinal axis in said housing, said shaft being adapted to close said switch when said dome-shaped portion is pressed in a direction along the longitudinal axis of said stem.

5. The portable receiver according to claim 2, wherein said control device is adapted to close a switch when said dome-shaped portion is pressed in a direction along the longitudinal axis of said stem.

6. The portable receiver according to claim 5, wherein said control device comprises at least one switching device including a shaft slidably mounted along its longitudinal axis in said housing, said shaft being adapted to close said switch when said dome-shaped portion is pressed in a direction along the longitudinal axis of said stem.

7. A portable receiver for receiving and displaying radio broadcast messages comprising a series of characters, said portable receiver comprising: a housing having at least one face; memory means for storing said messages; display means for displaying said stored messages, said display means being mounted on or visible through said face; and at least one control device including a manually actuable member, wherein said control device enables the manipulation of said stored messages by a rotation applied to said manually actuable member, said control device including a stem rotatably mounted in said housing around its longitudinal axis and said manually actuable member including a dome-shaped portion at least partially emerging from said face, said stem being fixedly attached to said manually actuable member so that said dome-shaped portion is rotatable around said longitudinal axis and said stem being arranged such that its longitudinal axis extends in the same direction as the at least partially emerging dome-shaped portion, and wherein said control device drives alternately first and second conductive blades which enter respectively into contact with first and second conductive tracks when said dome-shaped portion is rotated in either direction around the longitudinal axis of said stem, and, said control device further comprises two cam stages mounted on said shaft, said cam stages being adapted to respectively drive said first and second conductive blades.

* * * * *